Feb. 1, 1966  L. O. PARKER  3,232,291
SURGICAL ADHESIVE TAPE AND BANDAGE
Filed Nov. 23, 1962  4 Sheets-Sheet 1

INVENTOR.
LEON O. PARKER
BY
Owen, Wickersham, & Erickson
ATTORNEY

Feb. 1, 1966  L. O. PARKER  3,232,291
SURGICAL ADHESIVE TAPE AND BANDAGE
Filed Nov. 23, 1962  4 Sheets-Sheet 2

INVENTOR.
LEON O. PARKER
BY
Owen, Wickersham & Erickson
ATTORNEYS

Feb. 1, 1966 L. O. PARKER 3,232,291
SURGICAL ADHESIVE TAPE AND BANDAGE
Filed Nov. 23, 1962 4 Sheets-Sheet 3

INVENTOR.
LEON O. PARKER
BY
Owen, Wickersham & Erickson
ATTORNEYS

Feb. 1, 1966 L. O. PARKER 3,232,291
SURGICAL ADHESIVE TAPE AND BANDAGE
Filed Nov. 23, 1962 4 Sheets-Sheet 4

INVENTOR.
LEON O. PARKER
BY
Owen, Wickersham, & Erickson
ATTORNEY 3,232,291
SURGICAL ADHESIVE TAPE AND BANDAGE
Leon O. Parker, San Francisco, Calif., assignor to San
Francisco Research Corporation, San Francisco, Calif.,
a corporation of California
Filed Nov. 23, 1962, Ser. No. 239,442
28 Claims. (Cl. 128—156)

This invention relates to improvements in adhesive tape and bandages. More particularly, this invention relates to adhesive-coated or impregnated cloth which is stretchable both lengthwise and widthwise, and is infinitely variable between a highly porous and a substantially non-porous condition. In one preferred form, the invention relates to such materials which have been pre-stretched partially or completely in one direction thereby restricting further stretch in only the transverse direction.

My invention solves many problems associated with the various kinds of known adhesive tapes and adhesive bandages. One of these problems is that regardless of how tape or bandage material is applied over a body joint where at least some freedom of movement is desired, repeated working of the joint loosens the material and causes it to shift from its original proper position, bunching up the bandage and creating areas of constriction on the body part. If, in an attempt to prevent this, the bandage and tape are tightly applied, movement of the joint is restricted and circulation is reduced or even shut off, often with serious results. My invention solves these problems by providing adhesive tapes and bandages that tenaciously adhere to the skin or other surfaces with which they are placed in contact, and do not loosen, shift or bunch up even under the stresses of extensive joint movement.

Another problem common to most adhesive tapes and bandages is that they prevent air from reaching the area which they cover, thus impeding the healing processes of the body. When the usual adhesive tapes and dressings are applied over draining wounds, they restrict the flow of fluid and aggravate the damaged area. If these prior art tapes are placed to the side of the wound, the wound covering soon slips from place. My invention overcomes this problem by supplying a porous adhesive tape and bandage which can be applied directly over the wound to hold the dressing properly without measurably restricting the discharge of fluid or shutting off the air from the wound.

Still another disadvantage with the prior art adhesive tapes and dressings is that they are painful to remove, especially where they are in contact with hair-covered skin. The least painful way of removing these adhesives is to jerk them off with a quick pull away from the skin, but even this method causes discomfort, particularly where a large area is involved. My invention solves this problem by providing a new type of adhesive tape and bandage that can be stretched while in place on the skin and removed therefrom with little or no discomfort, regardless of the amount of skin covered or the degree of hair development.

Yet another problem with the adhesive tapes and bandages of the prior art is that when they are used to bind up body joints for support purposes, the desired support is established only by sacrificing most or all joint movement. Even using so-called "elastic bandages," which actually are elastic in only one direction, fails since they also restrict desirable joint movement when they are applied tight enough to give adequate support. My invention overcomes this problem too, by providing a new adhesive tape and bandage that will properly support a body joint without greatly restricting the ability of the joint to bend or flex in a desired direction.

I have discovered that if knitted material, or loosely woven material cut on the bias, is impregnated or coated on one or both sides with an adhesive composition, an extraordinary product results. This adhesive-bearing cloth, whether it be knitted or woven, flat or tubular, has unusual properties which none of the currently existing adhesive tapes or elastic bandages possess.

In addition to the aforementioned advantages, my new adhesive tape and bandage completely conforms to substantially any shape or configuration without unsightly puckering, bunching, or overlapping at the edges. Because of these unusual properties, my adhesive tape and bandage can be used for purposes, and in places, where conventional adhesive tape fails.

Other objects and advantages of my invention will become apparent from the following description and the accompanying drawings in which.

Considered broadly, my present invention comprises a sheet or tube of cloth that is both extensible and contractible along its major dimensions, and which has been impregnated or coated on one or both sides with an adhesive material. My invention includes this stretchable adhesived cloth alone as well as in combination with additional sheet or tubular layers of the same or different material, adhesived or non-adhesived, stretchable or unstretchable, and in combination with material which has been impregnated or coated with compositions other than adhesives, including release agents, hardening agents (i.e., plaster of Paris and the like), therapeutic agents, waterproofing agents, and many other various coatings and impregnants. My invention also includes the stretchable adhesived cloth in combination with a backing material, such as paper, lint, felt, cotton, crepe paper, sheet plastic, and other suitable backings. Thus, the stretchable adhesived cloth of my invention can be used in many ways and for many purposees.

The extensibility and contractibility of the cloth base can be explained as follows. When a sheet of this material is stretched lengthwise, it gains in length at the expense of a loss in width; when stretched widthwise, i.e. in a direction perpendicular to the lengthwise direction, it gains in width and loses in length. When a tube of this material is stretched axially, it gains in length at the expense of a loss in diameter and circumference and, when it is stretched circumferentially, it gains in diameter and circumference and loses in length. By alternately stretching and contracting the base in this manner, it can be accurately conformed to substantially any configuration of the object upon which it is to be placed.

It must be understood, however, that the stretch referred to above is not mere extension, for there is the corresponding contraction in the direction perpendicular to the direction of pull. Furthermore, the material suitable for providing the base of this invention does not necessarily have to be elastic so that it will restore itself to its original unstretched condition once the pulling force or stretching force is removed, but such truly elastic material can be used to some degree, as will be pointed out in greater detail later.

The preferred base material is knit cloth, but woven cloth cut on the bias or net material cut on the bias, both of which can be stretched on the bias lengthwise as well as widthwise, can be used. In addition to its stretching and contracting capabilities, the base material must be such that it can be restored to its original pre-stretched condition by a second stretching force applied in the direction transverse to the first stretching force. This property is possessed by the aforementioned woven, knit and net materials, since when they have been stretched in one direction, they can be restored to their former dimensions by a second stretch in the transverse direction.

Material that gets soggy or mushy when moistened and that tends to act in such a way that, once stretched, its former dimensions cannot be regained, is not suitable for use as the base material in this invention. For example, felt and cotton batting tend to pull apart and to remain so; they do not respond sufficiently to crosswise pull, and they do not regain their original shape. Therefore, they are unsatisfactory. The adidtional fact that they do not expand enough when pulled is itself a fatal defect, but their inability to be conformed by being reduced in size after being pulled out, is their more important failure. However, when such unsatisfactory material is adhered as a layer to any of the suitable base materials mentioned herein, the resulting unit may provide the desired two-way reversible stretch.

Although it may be true that practically any material may be stretched somewhat, in order to practice the present invention a really substantial change in dimensions is required—a marked ability to expand and contract under pull. As a minimum amount, the material satisfactory for use as a base should be expandable about 25% in each dimension, as compared with a neutral or midway position. For example, a 4" x 4" sheet of unstretched material would have to be expandable to about 5" x 3" when pulled in one direction and to about 3" x 5" when pulled in the transverse direction. Actually, the base may expand and contract much greater than this, but it should not generally be less. If its "neutral" or unstretched position, as manufactured, means a greater stretch in one direction than in another direction, the maximum stretch in one direction may be less than 25%, if there is sufficient stretch in the other direction to make up a substantial equivalent of total stretch.

For purposes of clarity, a base which is suitable, as explained above, will be a loosely-constituted thread-type cloth, and as stated elsewhere, the cloth is arranged for a substantial amount of extension along either of its major mutually perpendicular dimensions with contraction simultaneously along the other major dimension.

Figure 1:
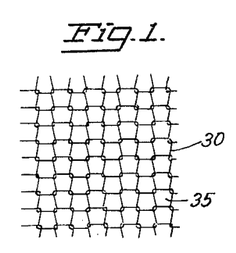
FIG. 1 is a plan view of a loosely knit fabric suitable for use in the manufacture of my adhesive tape and bandages.
Figure 2:
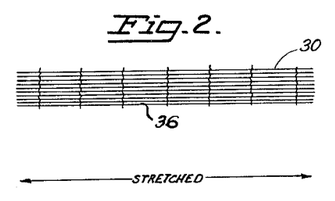
FIG. 2 is a plan view of the fabric of FIG. 1 stretched widthwise, showing how it has simultaneously contracted in length.
Figure 3:
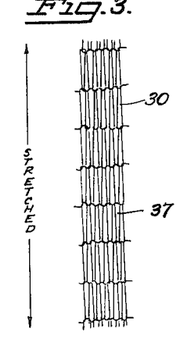
FIG. 3 is a plan view of the fabric of FIG. 1 stretched lengthwise, showing how it has simultaneously contracted in width.
Figure 4:
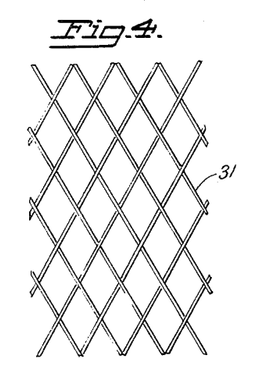
FIG. 4 is a plan view of woven fabric cut on the bias and suitable for use in the manufacture of adhesive tape or bandages according to this invention.
Figure 5:
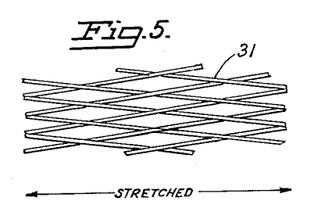
FIG. 5 is a plan view of the fabric of FIG. 4 stretched on the bias in one direction showing how it simultaneously contracts in the transverse direction.
Figure 6:
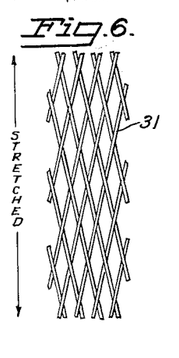
FIG. 6 is a plan view of the fabric of FIG. 4 stretched on the bias in the other direction.
Figure 7:
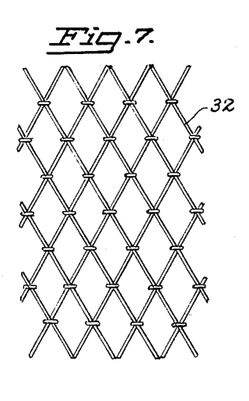
FIG. 7 is a plan view of net fabric cut on the bias and suitable for use in the manufacture of adhesive tape bandages according to this invention.
Figure 8:
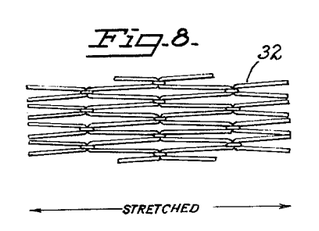
FIG. 8 is a plan view of the net of FIG. 7 stretched on the bias in one direction and thereby contracted in the transverse direction.
Figure 9:
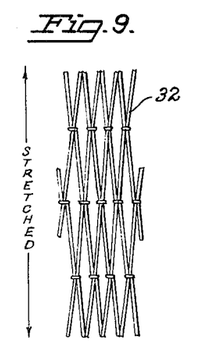
FIG. 9 is a plan view of the net of FIG. 7 stretched on the bias in the other direction.

Three of such suitable fabrics are illustrated diagrammatically in FIGS. 1–9. FIGS. 1–3 show a knit fabric 30 that, when stretched in width (see FIG. 2), contracts in length, and when stretched in length (see FIG. 3), contracts in width. FIGS. 4–6 show a woven fabric 31 cut on the bias. When this woven fabric 31 is stretched on the bias lengthwise or widthwise, it extends in one direction and, at the same time, contracts in the transverse direction (see FIGS. 5 and 6). FIGS. 7–9 show a net fabric 32, also with threads disposed on the bias; as with the woven fabric 31, when the net fabric 32 is stertched on the bias lengthwise or widthwise, it extends in the direction of the stretch and simultaneously contracts in the transverse direction (see FIGS. 8 and 9). Other forms of weaving known to the art, for example a "chicken wire" type of weave, may provide the desired two-way stretch.

By choice of materials various desired effects may be obtained. Various knit materials or forms of knitting may be used to make the two-way stretchable material or closed-mesh one-way stretchable material. Loose mesh rib knit material when stretched lengthwise is relatively smooth on both sides and, for some purposes, may be preferred to flat knit which regardless of how it is stretched will have a roughness on one of its two sides. On the other hand, when rib knit material is stretched widthwise, it has roughened seams on both sides. It is therefore not very satisfactory for widthwise stretching. It has a further advantage, however, that when it is adhesive coated and cut, it does not tend to roll or curl, as does flat knit material.

As an example, one type of knit material which has been found very satisfactory for purposes of this invention is a knitted tube with about twelve threads to the inch when in its normal or "rest" condition, i.e. not stretched in either direction so that the meshes are almost a square, as shown in FIG. 1. When stretched to its maximum length, a given tube 36 inches long may measure about 4½ inches in circumference, and when stretched to its maximum circumference the same tube will be about 10 inches long and 20 inches in circumference.

Another tubular material satisfactory for this invention, called stockinet, has 10 threads to the inch in each direction. When stretched out lengthwise to the maximum, it then has 7 threads to the inch along its length and 34 threads to the inch along its width. When stretched widthwise, to the maximum, it will have 34 threads to the inch along its length and 7 threads to the inch along its width. The circumference of the tube can be varied by stretching from 12 inches to 58 inches.

One of the important features of this invention is the variation in the size of the interstices between the threads or strands of the cloth. This change in the interstice size is accomplished by varying the degree, and the direction, of stretch exerted on the cloth. For example, with a tube of knitted cloth stretched radially, the interstices are substantially rectangular in shape, and if the stretch is in an axial direction, the interstices are generally triangular in shape (see FIGS. 2 and 3, respectively). When the same knitted cloth tube is stretched to the maximum, either radially or axially, the threads or strands of the cloth lie closely adjacent or in contact, thus leaving a substantially smooth surface which has potential openings of pores between the threads. If the stretch is exerted at the same time the threads are pressed or crowded in the contracting dimension, they tend to lie in closer proximity. They may be closed tighter with firmer contact of the threads of the knit goods if there is an obliquity of the row of loops in the knit, which pass in general in a perpendicular dimension to the stretching. Thus, the rib of the knit remains parallel to the direction of stretch and the wale of the knit is oblique to the direction of stretch when the stretch is in the long axis of a knitted tube. On the other hand, when the stretch is in the circumferential axis of the tube (or in the flat section if the tube is split), the wale will be parallel to the direction of stretch, and the rib will be oblique to the direction of stretch.

The stretching procedure can be simply accomplished. For circumferential stretching, two rods may be placed through a section of the tube and, before stretching, the tube is rotated on the rods so that there is an oblique direction of the ribs. If stretching is to be in the longitudinal dimension, the section of the knit tube may be stretched essentially to its maximum and then placed in two clamping devices that engage the knit perpendicular to the axis of stretch; then additional stretch is applied with the clamping devices in a direction oblique to the axis of stretch. Cutting and stretching on the bias can accomplish the same purpose but may be a more difficult procedure.

With woven or net cloth cut on the bias, a different condition prevails. When either of these two materials is stretched to the maximum, lengthwise or widthwise, the strands or threads come to lie in a totally abutting position so that the material can be said to have closed interstices. When the stretch is less than the maximum, the interstices will be "open," that is there will actually be openings between the strands, and the size of these openings will be governed by degree of stretch. (See FIGS. 5, 6, 8 and 9.)

After stretch is made on the goods either knit or cut on the bias so as to close, or partially close, the pores or meshes, further processing will fix or keep the stretch condition as desired. Conditioning is obtained in a number of ways. In case of cotton goods the material may be dampened or wet slightly and stretched to the desired mesh size and ironed with a hand iron or mangle. Alternately the stretched wet goods may be exposed to either air heat or steam heat of a temperature of 250° to 300° F. for about 15 minutes. The conditioning may be greatly modified by the addition of sizing through the cotton. For example, the cotton fabric may be washed in a solution of one part polyvinyl acetate emulsion (Polico 529, Borden Chemical Company) and 20 parts of water before it is carried through the stretch, heat and ironing procedure. Various sizing agents are suitable. When the open mesh cloth is made of synthetic fibers, such as nylon, orlon, rayon, etc., heat-processing while the cloth is stretched conditions the strands, and they tend to stay in place and retain the meshes produced by the stretch. In the stretched state, the goods may be passed through a heat-mangle or hand ironed, or heat may be applied by hot air or steam under pressure, varying according to the nature of the synthetic material and the size of the thread, usually at 300° F. for 15 to 20 minutes.

After the fabric is stretched to produce meshes of the desired size and shape, either open or closed with potential openings, and the fabric is conditioned to set the mesh, it may be used as an adhesive base with adhesive on one or two sides. When closed mesh fabric is used as a base for adhesive bandage or adhesive tape, the adhesive may be sprayed or otherwise applied to one side of the fabric while the fabric is still mechanically kept on stretch and the meshes kept closed. On the opposite side from the adhesive the fabric may be treated, sprayed or otherwise, with a release agent which tends to block the adhesive from the fabric and enables rolling the tape without a separator, or the tape may be rolled with a separator. (The release agent may be heavy paraffin made liquid with benzine and heat for application purposes.) With open mesh adhesive tape or bandage, the adhesive itself may be sufficient to maintain the desired state of stretch and size of mesh without the need of other conditioning. When a backing is used on the tape, it likewise may be sufficient to maintain the desired mesh form.

Knit, woven, or net cloth stretched so that the interstices are "closed" have been found to be highly suitable for surgical tape and bandages, particularly where restriction of movement in one direction and freedom of movement in the transverse direction of the body part is desired. If, for instance, a length of knitted cloth bearing an adhesive is stretched in one direction and applied to a body joint, it will stop motion in the direction of the stretch, yet will permit motion in the transverse direction. This is very useful in applying tubular dressings over body joints where motion must not be restricted in certain directions but yet the dressing must be held intact and in place. Since all of these materials within the scope of this invention have this two-way stretch, the direction of freedom or restriction of movement of the body joint or member can be adjusted to suit any particular situation.

If the cloth is stretched only partially in one direction, it can later be stretched further in that direction or in the transverse direction, i.e. in both directions. Where some restriction of movement of a body part is desired in one direction but not in the transverse direction, this intermediate degree of stretch provides the answer.

Figure 10:
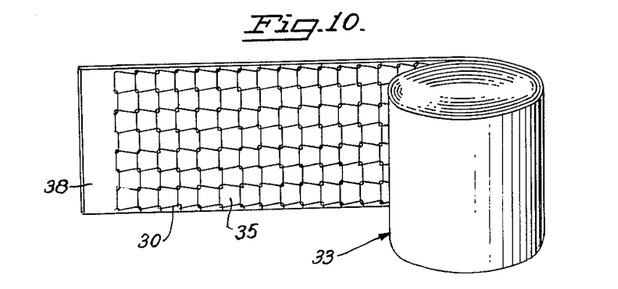
FIG. 10 is a view in perspective of unstretched knit adhesive tape wound into a roll with a separator dividing each layer of the roll.
Figure 11:
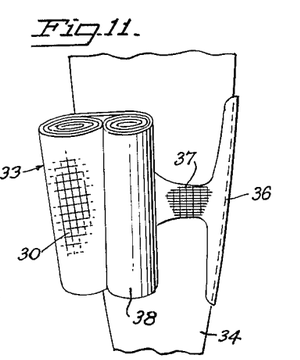
FIG. 11 is a view in perspective showing application of the knit adhesive tape of FIG. 10 to a patient's leg, illustrating how a lengthwise stretch of the tape will narrow it and close the interstices between the strands of the knit.

FIGS. 10 and 11 illustrate a roll 33 of unstretched tape according to my invention made from knitted cloth 30, and also show how the cloth 30 can be stretched in two directions as the tape is unwound from the roll and applied to a body part 34. In FIG. 10 the knit cloth 30 is in the unstretched condition so that the interstices 35 are relatively square in configuration. If the tape is stretched widthwise as illustrated at 36 in FIG. 11, the interstices become very long, narrow, and rectangular in shape, as illustrated more clearly in FIG. 2. When the tape is stretched lengthwise as at 37 in FIG. 11, the interstices take on a somewhat triangular configuration as best illustrated in FIG. 3. One nice feature about this type of two-way stretch is that the tape can be adjusted to substantially any configuration of the body part, and can be similiarly adjusted to cover only specific areas of the body part regardless of their size or shape.

Figure 21:
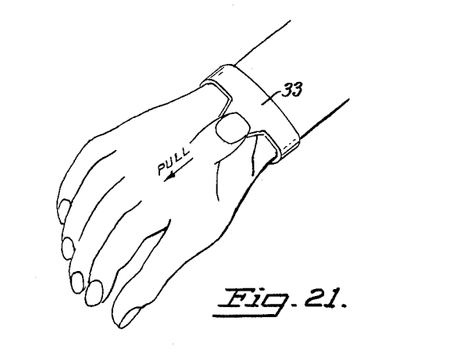
FIG. 21 is a diagrammatic view in perspective illustrating the shearing effect set up when knit adhesive tape is removed from an object by stretching it transversely to the original direction of stretch.

When the two-way stretch adhesive tape is to be removed, this may be done much more conveniently than with ordinary tape. My tape 33 can be given a side stretch (see FIG. 21) that causes the loops to glide and to release the adhesion without a direct pull on the skin. The ability to remove the adhesive tape in this manner practically eliminates the usual discomfort to the patient which occurs in the well-known method of removing conventional adhesive tapes and bandages.

The knit cloth 30 may be provided with the adhesive by saturating it with an adhesive mass which has been softened or liquefied by heat or a solvent. For example, an adhesive mass may be produced by slowly warming and stirring together in a water-jacketed double boiler 100 parts of natural gum rubber, 150 parts of natural resin (e.g., colophony), 100 parts of finely powdered zinc oxide, and 20 parts of mineral oil, until the mass becomes semi-liquid at a temperature of about 120° F. If desired, a mechanical mixer may be used to thoroughly stir and mix the mass. The section of knit cloth 30 is dipped into the hot adhesive mass while that mass is still semi-liquid, and at about 120° F. to 150° F., and the cloth 30 is agitated and kneaded until the adhesive material has thoroughly saturated the fabric. The fabric is then preferably wrung out as dry as possible and, before cooling, the saturated fabric may be stretched to any desired prestretch in any direction or processed in any of several different ways.

While the roll 33 in FIGS. 10 and 11 is made from a long rectangular strip 30 of knit material, a similar roll may be made from a strip of net 32 or woven material 31 cut on the bias (FIGS. 2 to 7) by impregnating either of them with adhesive and rolling them in the same general manner.

The roll 33, as shown in FIG. 10, is preferably made by rolling up the adhesived fabric 30 with a layer 38 of suitable separating material, such as crepe paper. Depending upon the result desired, the separator 38 may be made from any of a variety of materials. A smooth, impervious separator 38, such as a plastic strip, will readily release from the cloth 30 as the roll 33 is unwound, as shown at 38 in FIG. 11. Papers of various smoothness can be selected and treated with various sizings to give any desired degree of adhesion of the separator 38 to the tape 30. On the other hand, with a more porous separator 38, such as crepe paper, the tape 30 may be made to adhere to it on one side so that the separator 38 forms a temporary or permanent backing for the mesh 30. If lightly adhered to the tape 30, the backing will likewise release as shown at 38 in FIG. 11. If more strongly adhered, the backing 38 will remain on the tape 30 and add rigidity to the tape 30 during application.

Figures 17, 18, 24, 25:
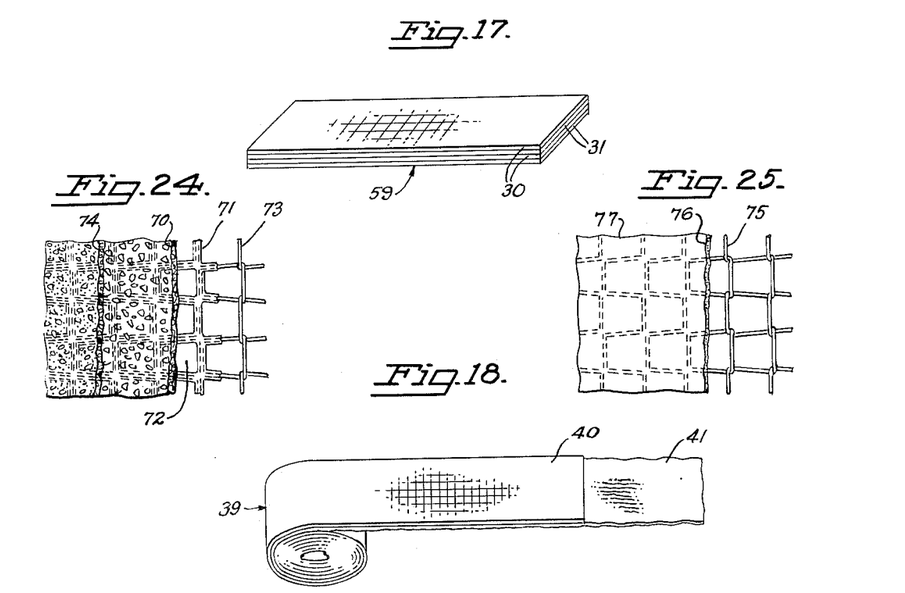
FIG. 17 is a diagrammatic view in perspective of a section of the composite adhesive tape made up of alternate layers of fabric.
FIG. 18 is a view in perspective of a roll of unstretched knit adhesive tape with a stretchable backing, the tape and the backing joined together in a condition such that both can be stretched either lengthwise or widthwise.
FIG. 24 is a fragmentary plan view, with portions broken away to show successive layers, of a knit adhesive tape having a filler between the threads on one side of the cloth, the other side remaining adhesive.
FIG. 25 is a view similar to FIG. 24 of a tape having a plaster of Paris and adhesive mixture thereon.

A form of the invention, advantageous in certain applications, is illustrated in FIG. 18 wherein is shown a roll 39 of unstretched knit adhesive tape 40 combined with a stretchable backing 41 of crepe paper, or the like, so formed that both can be stretched either lengthwise or widthwise. Normally, if a length of knit tape containing adhesive is applied to a similar length of crepe paper while both are in a non-stretched condition, the resulting composite can be stretched in only one direction (i.e. the direction of stretch of the crepe paper) without rupture of the crepe paper. At times it is desirable to have a crepe-paper-backed adhesive tape that can be stretched both longitudinally and laterally. For this purpose, I take a desired section of adhesive knit tape 40 and stretch it in one direction (i.e. lengthwise or widthwise) and then adhere it to a similar section of crepe tape 41 that is stretchable in the transverse direction (i.e. widthwise or lengthwise, respectively). The two are then stretched somewhat in the transverse direction yielding a two-way stretchable paper backed adhesive tape which can be readily rolled and stored for use as shown in FIG. 18. Tape of this type has the advantage that, upon application, ridges are more readily smoothed out.

In a similar manner, one-dimension-extendable material, such as cotton batting, may be adhered to a piece of the extendable tape with the tape stretched toward its maximum in either direction, and if the cotton is placed so that its potential extension is in the same dimension as the tape, then the two materials can be extended in their potential dimension toward the maximum, or this extension may be arrested with the meshes in any state desired, and it may be restretched back to the original. Such a batting that is practical for this purpose is Webril R–2251 made by Kendall Mills. Another such material, extendable in one direction only, is Viscon D–750–CLV–3278 and S–225–1941 made by Chicopee Mills, Inc.

A cotton batting made of 85% lint cotton and 15% long cotton is extendable in any dimension but is easily fractured. Such batting may be adhered to open-mesh or closed-mesh adhesive material of this invention and have extendability along with the adhesive material. The combination has contractibility because the so-called soggy material or non-woven or non-dipped material is adhered to the woven or knit material.

Fillers or backings made of extendable cotton material, cellulose materials, and similar materials may be waterproofed to prevent water from entering.

Figure 12:
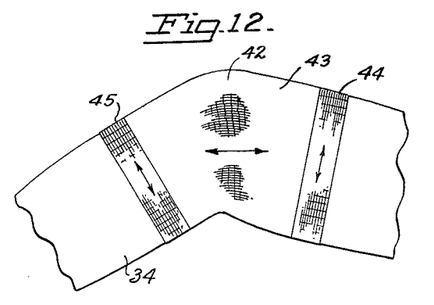
FIG. 12 is a view in perspective showing a bandage of the knit adhesive tape of FIG. 10 on a knee of a patient and illustrating how the tape can be stretched widthwise as well as lengthwise to smoothly conform it to the curvature of the knee.

Some of the advantages of my two-way stretch adhesive tape are illustrated in FIG. 12 wherein is shown an adhesive bandage made from three lengths 43, 44 and 45 of such tape in a specific application on a patient's leg 34 at the knee 42, in a manner to give desired support to the joint. The main part 43 of the bandage, covering the knee 42, is formed by one or more wrappings of the adhesive tape 33 stretched widthwise to about its maximum. This forms a bandage which will restrict longitudinal motion of the joint, while permitting some expansion. To restrict slippage of the bandage, the upper and lower edges are secured by wrappings 44 and 45 of the adhesive tape 33 stretched lengthwise. The composite bandage will thus give firm support without the complete restriction of motion caused by conventional adhesive tapes.

Figures 13, 14:
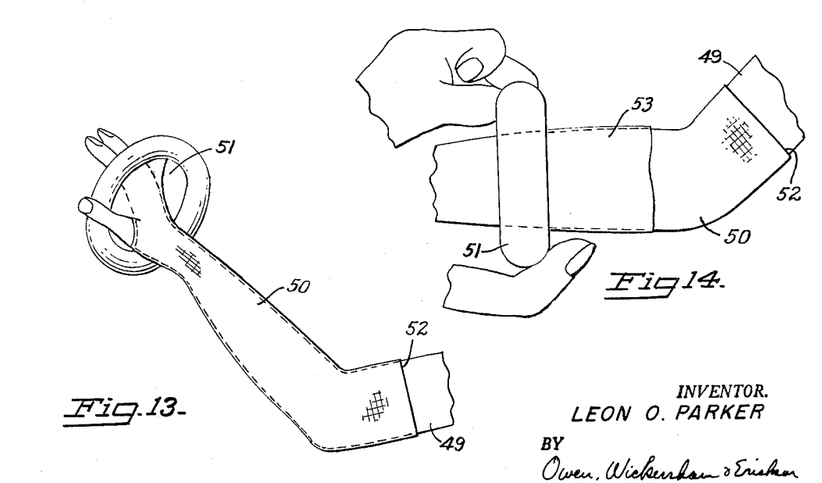
FIG. 13 is a view in perspective of a tubular knit adhesive bandage covering a patient's arm, showing how it can be stretched lengthwise as well as radially as it is applied from a doughnut-shaped roll to conform smoothly to all contours of the arm.
FIG. 14 is a view in perspective of a tubular knit adhesive bandage being applied over a patient's arm from a doughnut-shaped roll that was formed by rolling up together a length of the tubular bandage and a length of tubular or sheet plastic concentric with the bandage, so that the plastic acts as a separator between each layer of bandage.

For surrounding a body part, such as an arm or leg, with a flexible adhesive bandage, I prefer to form my adhesive tape from a knitted tube, instead of from the knitted or woven strip 30 illustrated in FIG. 10. (Instead of a knitted tube, a strip of cloth with threads on the bias as in FIGS. 4 and 7 may be sewed together at the two edges to form a tube.) After applying the adhesive by immersion, spraying or otherwise (as has been described for the knitted strip), the resulting tubular adhesive tape 50 may be applied over an arm (or other body part) as shown in FIG. 13. The two-way complementary stretch of the knitted tube 50 permits the bandage to be stretched or contracted, by pulling or twisting, to produce as snug a fit as desired.

For ease in applying, as well as ease in storing and shipping, the adhesived tube 50 may advantageously be rolled into a toroid or doughnut roll 51. Preferably, before rolling and either before or after the adhesive is applied to the knitted tube 50, the tube 50 should be stretched radially to its maximum diameter. The fully stretched tube 50 will produce a firmer toroid 51 of greater internal diameter, enabling much greater ease in applying.

Figure 16:
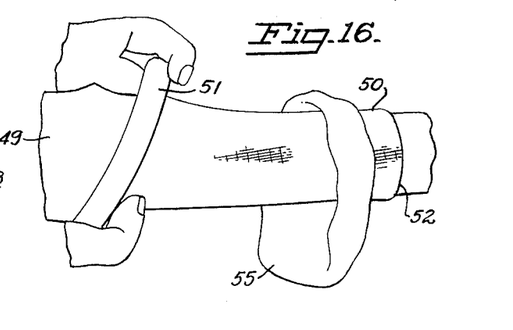
FIG. 16 is a view in perspective of two concentric lengths of tubular knit bandage being applied around an object from a doughnut-shaped roll, one length being adhesive and the other non-adhesive.

My co-pending application Serial No. 133,677 filed August 24, 1961 and now Patent No. 3,097,644 describes and claims the use of a non-adhesive knit bandage formed into a similar doughnut roll. The adhesive bandage of the present invention has advantages over a non-adhesive bandage, particularly in providing less slippage and more firm support for the injured part. As shown in FIGS. 13, 14 and 16, the object to be bandaged is inserted into the doughnut roll 51, the end 52 of the tube 50 is adhered to the arm 49 or other part to be bandaged and the bandage unrolled over the part 49. By pulling the doughnut roll 51 lengthwise of the body part 49, the adhesive tube bandage 50 can be caused to shrink in diameter and firmly encase the desired area. Further rigidity can be obtained by rotating roll 51 about its axis while unrolling; this will twist the tube 50 upon the body part and give a diagonal stretch to the threads.

Before rolling the adhesive fabric, it may be wet in warm water containing about 15 to 25 percent of isopropyl alcohol, or similar solvent. This makes the adhesived material softer, and the water and alcohol on its surface restrains the layers of the roll from adhering to each other, which would produce great difficulty in unrolling. The water and alcohol may be evaporated before the bandage is packaged or they may be left in and the device canned with a sealed wrapper or some other type of canning, such as in a tin can, a glass jar, or a plastic bag, or any other means which prevents evaporation. The water-alcohol mixture, if retained, makes the adhesive unroll easier at the time of application. Upon application, the water-alcohol mixture readily evaporates so that the bandage adheres as desired. If more positive separation of the layers is desired, the adhesived doughnut roll 51 may have a separator 53 or 55 rolled between its layers in addition to, or in lieu of, the water-alcohol solution, as shown in FIGS. 14, 15 and 16.

Figure 15:
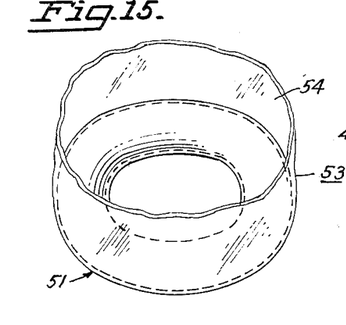
FIG. 15 is a view in perspective of a doughnut-shaped roll like that of FIG. 14, showing the end of the plastic tube before it is wrapped around the roll to enclose the roll in an airtight moisture-proof container.

As illustrated in FIG. 15, the separator 53 may be a plastic tube about the same size as the knit tube 50, or instead, as in FIG. 16 the separator 55 may be made out of a similar knit material treated, if desired, with a suitable release agent, such as Du Pont Quilon applied at 10%. (Du Pont Quilon is a Werner-type chromium complex in isopropyl alcohol, well known in the art as a sizing agent for paper, and for the treatment of felt, leather, wool fabrics and the like; as an anti-blocking or release agent; and for insolubilizing various water-soluble or swellable coatings.) To produce the roll 51, a section of the adhesive-saturated tubular knit material 50 is first stretched to its maximum circumference over a soft core. A tube of plastic 53 that is not adherent to the adhesive or that has been treated with a release coating, as mentioned, may be placed around the outside of the adhesived tube 50 and the two rolled up together as shown in FIG. 15. In lieu of a plastic tube, it is possible to use a sheet of plastic, or other material, as the separator wrapped around the adhesived fabric tube 50 and rolled in. Rolling the tube 50 on a soft core produces a firm doughnut roll 51 in an expanded position. By having the plastic tube 53 or 55 extend longer than the finished end 52 of the roll of knit material, the excess length 54 of plastic may be wrapped around the finished doughnut roll 51 to form a sealed package to prevent evaporation of the water or alcohol or of other volatile elements in the adhesive.

FIG. 13 shows the application of an adhesive bandage 50 from a doughnut roll 51 when no separator is present, as when the roll 51 has been processed with the water-alcohol wetting as described. FIG. 14 shows the formation of a bandage 50 from a roll 51 containing a plastic separator 53 which unrolls as the bandage is formed and which may be removed on completion of the bandage. FIG. 16 shows the application of a bandage from a toroid roll 51 of adhesived knit tubing 50 where the separator 55 is composed of a similar knit tubing, without adhesive, which has been treated with a release agent. The separator 55 releases readily upon unrolling, as shown, and may be removed or, preferably, it may be allowed to remain as an outside non-sticky layer for the finished bandage. Being made of two-way stretchable knit fabric, the tube 55 may be stretched to fit snugly around the adhesive tube 50, to form a comfortable bandage which will not stick to the clothing of the wearer.

It may be noted here that the tubular knit fabric containing the adhesive material may be changed to a flat adhesive tape either by splitting the tube lengthwise or by cutting spiral rings or ribbons from the tube. If the tube is stretched longitudinally and then split lengthwise, such tape will have one smooth side and one side with cross ribs. Likewise, if the tube is stretched to its maximum circumferential dimension and then cut into ribbons or tapes encircling the tube, it will have one smooth side and one cross-ribbed side. If the tape is not stretched in either direction but is permitted to remain about half-way between its maximum stretch circumferentially and its maximum stretch longitudinally, it will have meshes or interstices or openings in a generally rectangular shape and it will have potential stretch in either direction. It will be noted that this material is a two-sided adhesive, adherable on either side, so that when rolled in a simple roll, some type of separator or means keeping it from sticking to itself should be used. If the tape is made with its stretch less than the maximum in either direction and still has potential stretch in the longitudinal direction, it may have a separator made of extendible material, such as crepe paper, with the crepe paper's extendibility being in the long dimension of the ribbon or tape.

An important advantage of the two-way stretch adhesived material is that it may be placed over uneven surfaces with equal tension and without wrinkles. This is illustrated broadly in FIG. 11 where the material is being unrolled around a body portion which tapers. It can be unrolled without having any wrinkles and it can be stretched to conform to the parts desired. When crepe paper is used as a backing for the tape, as it is unrolled in application, the crepe paper does not prevent stretch of the adhesive in the application process and helps it to adjust to the uneven surfaces.

Any of the so-called pressure-sensitive type of adhesive materials may be used as the adhesives. Further examples include the chloroparaffins, which may be applied in emulsions that rapidly become dry. Alcohol-soluble gums, such as benzoin and aloes, may be used. Water-soluble materials, such as polyvinyl alcohol or gelatin or methyl cellulose or a combination of these may be used. The adhesive may be the well known Unna's paste. The materials just mentioned should be applied and the thus treated tape should be packaged while they are in a semi-liquid state. Evaporation of the solvent after application produces the desired adhesive or stiffening quality. For example, a doughnut roll of knit tubing may be soaked in a tincture of benzoin for 30 minutes and then canned in a glass or tin container. When the roll is to be used, the container is opened and the bandage applied. As the alcohol evaporates, the fabric becomes tacky and finally hardens and glues to anything to which it is contiguous. Eventually it loses its tackiness. As another example, Unna's paste, which has commonly been used on cheese cloth-type bandages, is made soft by heating to 120° F. and a section of knit fabric tube is passed through it until it is saturated. Then the knit fabric is either rolled into a doughnut roll and stretched and canned or the knit fabric tube is split, rolled into split tapes with the amount of stretch desired, and canned. These old medical compounds have long been used on ordinary cheesecloth or other cotton fabrics but not on a two-way stretch dressing.

With usual adhesive or pressure tapes, the backing is essentially non-porous, and the adhesives create a potential vacuum between the tape and whatever object it is adhering to. In knit fabrics, which have actual spaces or potential spaces in the fabric, the adhesive's potential to form the vacuum effect may be lost by air passing through the spaces. Therefore, as shown in FIG. 24, particles 70 of inert materials in the adhesive 71 may sometimes advantageously be used to close the spaces 72, or potential spaces, of the bandage 73, to greatly increase the adhesive effect without eliminating the two-way stretch quality. Such materials 70 may be coarse powders, like gypsum powder, paper pulp, or magnesia powder. Alternatives are crepe paper, cotton batting with fibers combed in a direction parallel to one dimension, or other extendible material or materials. Plaster of Paris may be used advantageously. As a specific example, a section of knit tubing selected from any of the varieties heretofore named may be saturated with rubber adhesive material made quite liquid by heating and preferably thinned with a solvent such as mineral oil. After the section of fabric 73 is saturated, it is not squeezed as dry as is usual but is stretched to its maximum circumference and then, before the mass cools, it is covered with finely divided particles 70 of paper pulp. Immediately, the excess paper pulp that does not stick is shaken off. The adhesive tape 73 so prepared may be rolled into a doughnut roll or cut into strips and canned. If desired, the tape may be further treated by spraying its paper pulp surface with additional adhesive 74 heated to, say, 200° F. and thinned with benzene. The benzene is then evaporated before the tape is rolled or canned.

One unique embodiment of this invention uses plaster of Paris as a filler for the meshes and carrier of adhesive materials in an adhesive tape. Heretofore, plaster of Paris has not been used as an adhesive material. Rather, it has been used as a splinting or cast material but not as a carrier for adhesives. In the knit backing for adhesive material where the phenomenon of stretch and opening and closing of meshes is carried out at the time of the application, a permanent setting material as exemplified by plaster of Paris can be caused to accumulate in the meshes and give additional rigidity. A section of tubular (or flat strip) knit fabric 75 may be stretched on a frame to essentially its maximum circumference (or width), but the threads are not pressed or worked together and the meshes are still open. The fabric 75 is then covered with a pneumatic spray of a mixture of plaster of Paris and adhesive 76. The mixture 76 may be finely divided gypsum particles with any suitable adhesive materials. Considerable plaster of Paris adhesive mix is applied to the fabric and it is then exposed to heat to calcine the gypsum to convert it to plaster of Paris. Heat of 275° for three hours will change the gypsum to plaster of Paris and, in so doing, each particle of gypsum tends to explode and break itself loose from the glue mix, so that water can penetrate the plaster of Paris mass and enable it to reset. Before the heat is applied, the glue has already sealed the gypsum particles in a very tight bond, and water cannot penetrate unless soaked for an extended time. When the gypsum is calcined, each particle, as said, tends to explode at the time it loses its water of crystallization and this breaks it loose from the adhesive or glue to an extent sufficient to provide many openings for the water to enter.

For example, 4,500 grams of gypsum powder may be added to 3 liters of water to which has been added 60 grams of a cold-water-soluble polyvinyl alcohol (such as Borden Chemical Company's "Lemol 42–88"), 15 grams fully hydrolyzed polyvinyl alcohol (such as Borden's "Lemol 51–98") and 300 grams of methyl cellulose (such as Dow Chemical Company's Methocal #8000 cps.). The entire glue mix and water are stirred after they are combined; then the gypsum particles are added and well stirred in. If it is desired to make the final product so that it can be more easily or more rapidly saturated with water, the gypsum particles can be made larger by using less finely ground gypsum, or less of the fully hydrolyzed polyvinyl alcohol may be used. The knitted cloth is then sprayed with this mixture and calcined at 275° F.

Such a plaster of Paris tape 77 is quite different from the plaster of Paris coated cloth strips heretofore used to make casts. Here, the plaster of Paris is a component of the adhesive material. When put on the skin, the plaster of Paris even does some adhering to the skin, though basically adhesion is from the glues. However, unlike the other types of adhesive tape of rubber base or otherwise, these glues and plaster of Paris take moisture up from the skin, ventilate it, and still retain the adhesion. Even though the plaster of Paris does stiffen the fabric, there is still some gliding and adjustment of the loops when movement occurs, unless the plaster of Paris was applied too heavily to the knit fabric. In use, the tape 77 is wet in warm water and immediately becomes pliable and soft. It is applied in one or two or more layers, either next to the skin or over bandages or material that need to be secured. After a few minutes, the plaster of Paris tends to set. At that time, if the tape is well massaged and softened, it will have a tendency for some adhesion and at the same time not be a rigid cast. Until the drying effect takes place, adjustments or movements by the gliding of the loops tends to occur and helps to smooth out the wrinkles.

Figure 22:
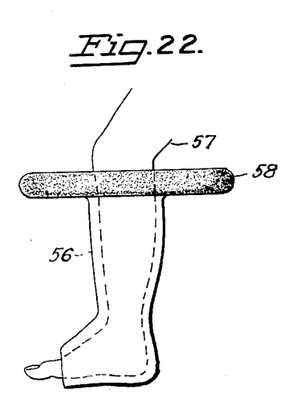
FIG. 22 is a view in side elevation and partly broken away of a patient's leg covered by a cast containing a layer of knit adhesive material.

FIG. 22 illustrates the use of plaster of Paris treated adhesive tape in the application of a rigid cast-like bandage 56 to the leg 57 of a patient. A doughnut roll 58 of adhesive tape, impregnated with plaster of Paris in accordance with the foregoing, is immersed in warm water and, when the material becomes pliable, the tubular bandage 56 is unrolled from the toroid 58 upon the leg 57 and stretched longitudinally to reduce the diameter to a form-fitting bandage which can be smoothed out as desired before the plaster of Paris completely sets. If desired, several layers of fabric can be applied, one over the other, by unrolling roll 58 back and forth, up and down the leg 57.

An embodiment of the invention, advantageous in certain applications, is illustrated in FIG. 17, wherein is shown a composite adhesive tape 59 fabricated from alternate layers of knit fabric 30 and bias-cut woven cloth 31. The composite may be made by separately coating each layer with adhesive and super-imposing the required number of layers (which may be two or more as needed for any desired purpose) and adhering them together under pressure, as by rolling or ironing. By prestretching any one of the layers in one direction, e.g. either or both of the woven layers 31, a limited amount of stretch can be imparted to the composite tape 59 as desired. Alternately, the composite tape 59 may be composed of a plurality of layers of similar fabric with one layer 31 stretched in a different state than another layer 30. For instance, one layer 31 may have all the stretch taken out in one direction with the meshes essentially closed, while another layer 30 may have open mesh. This gives an adhesive unit which in one area would have no extendibility while in another area it has great extendibility. Such adhesive unit might be placed along the knee joint and the extendible part or open mesh part over the front of the knee joint. This would protect the stretch of the ligaments on the side of the knee joint but would enable motion and stretch about the front of the knee joint. Such a tape gives an athlete motion in the knee at the same time protecting the weakened ligaments on the sides.

Figure 19:
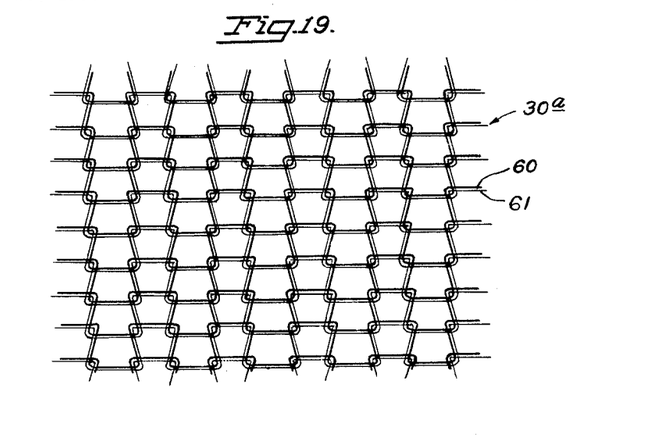
FIG. 19 is a view in perspective of a length of adhesive tape made with knit material knitted from two coextensive strands, one strand made from a natural fiber and the other made from a synthetic fiber.

In preparing the adhesived tapes of this invention, it may be desirable to knit a base fabric 30a from two strands 60 and 61 of thread of dissimilar properties, as shown in FIG. 19. In this manner various useful composite effects may be obtained. As an example, if one thread 60 is cotton and the other 61 is a synthetic fibre such as nylon, different adherence qualities are obtained as well as different capillary action (permitting less or more discharge from wounds through the interstices of the mesh). The cotton strand 60 is advantageous in having greater adherence to the adhesive, while the synthetic strand 61 provides greater strength than can be obtained from cotton alone. The smooth surface of the synthetic thread provides excellent flexibility for contracting or expanding the knit cloth, while the cotton provides greater adhesion of materials that may be added to the bandage, such as gums, adhesives, medications, and stiffening agents.

As another example, if one strand 61 is an elastic thread and the other 60 relatively non-elastic, the tape 30a will have enhanced elasticity while still retaining the important property of any stretch in one direction being accompanied by a corresponding transverse contraction. This property provides an elastic bandage much less likely to wrinkle or detach than a bandage composed of elastic tape. If desired, one strand 61 may be more loosely woven than the other 60, yielding a composite having any desired flexibility.

Figure 20:
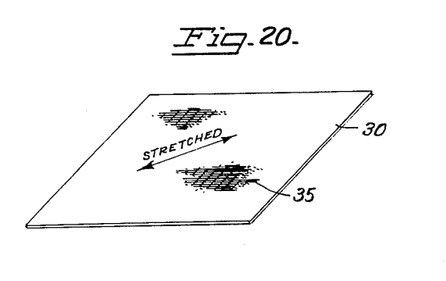
FIG. 20 is a plan view of a piece of knitted adhesive material which has been stretched to the maximum in a direction 45 degrees from the lengthwise direction, showing how the interstices between the strands are closed completely.

FIG. 20 illustrates how, by stretching a knitted cloth adhesive tape 30 on the bias, the interstices 35 can be caused to close more completely than by stretching along either major axis, giving the almost completely closed interstices which may be attained with woven cloth cut on the bias. Adhesive tapes having closed interstices have greater smoothness and give greater anchorage. At the same time they can be removed by stretching in a transverse direction to open the meshes with ease and without damage.

Figure 23:
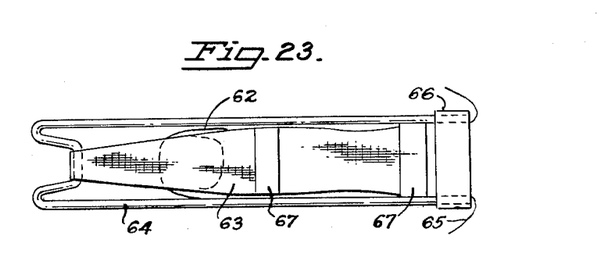
FIG. 23 is a plan view of a patient's outstretched finger, illustrating how knit adhesive tape can be used to anchor tubular traction bandages.

FIG. 23 illustrates the advantageous use of my knit adhesive tape as an anchor for a tubular traction bandage as applied to a patient's finger 62. Finger 62 is encased in a length of tubular knit material 63 (which can itself be coated with adhesive, forming a tubular stretchable adhesive tape) which is stretched over frame 64 which is anchored at 65 by a binding of knit adhesive tape 66 wound around the finger and frame while being stretched lengthwise. The adhesive on the tape 66 anchors the entire contrivance firmly to the base of the finger 62. If desired, additional rings 67 of stretched adhesive tape may be bound around the tubular knit material 63 for further anchorage. This type of traction bandage fits more evenly than the prior art tape traction, and at the same time it does not have the disadvantages of elastic tape traction in that it does not tend to constrict.

To those skilled in the art, various modifications will suggest themselves, all within the scope of the invention. For example, other forms of weaving than the specific examples given will give suitable coarse cloth having the desired two-way complementary stretch. Also, the two-way stretch materials may have adhesive applied in some areas with blank areas or no adhesive in other areas, providing a bandage that may be applied across an incision with no adhesive over the incision but adhesive on each side so that tension is provided to keep the incision from pulling open. The resulting adhesive unit protects the wound from being pulled open from side to side but may be readily removed by a side-stretch with less wound damage and less pain.

I claim:

1. A surgical adhesive tape comprising a cloth fabric having threads arranged to enable at least 25% extension along its major dimensions, elongation in one direction being at the expense of contraction in the direction normal thereto, an adhesive on said fabric, said tape being pre-extended in one direction, with resultant contraction in the direction normal thereto, and means for retaining the pre-extension of said tape prior to application on a body member.

2. The tape of claim 1 in which the fabric is knitted cloth.

3. The tape of claim 1 in which the fabric is woven cloth on the bias.

4. The tape of claim 1 in which the fabric is net on the bias.

5. The tape of claim 1 in which the adhesive is present on part only of the fabric.

6. The tape of claim 5 in which the adhesive is present at both ends of the fabric with an adhesive-free section between adapted to cover a wound.

7. The tape of claim 1 in which the adhesive is present at both ends of the fabric with an adhesive-free section between adapted to cover a wound.

8. The tape of claim 1 wherein said pre-extension is carried short of the maximum extent.

9. The tape of claim 1 wherein said pre-extension is carried to its maximum extent, thereby substantially closing the openings between the threads of the cloth and enabling extension upon application only in the direction normal thereto.

10. The tape of claim 9 in which the adhesive is present at both ends of the fabric with an adhesive-free section between adapted to cover a wound.

11. A surgical adhesive tape comprising a fabric knit from at least two separate but co-extending strands, one of natural fibers, another of synthetic fibers, arranged to enable substantial reversible elongation along one major axis with complementary contraction in the direction normal thereto, and a pressure sensitive surgical adhesive on at least one side of said fabric.

12. A plural-layer surgical adhesive tape comprising alternate layers of knit fabric and bias-threaded woven cloth, having threads arranged to enable at least 25% extension along its major dimensions, elongation in one direction being at the expense of contraction in the direction normal thereto, and an adhesive secured to both sides of at least one said layer.

13. The tape of claim 12 in which at least one layer and less than all the layers is pre-extended in one direction thereby providing the said tape with restricted extensibility in that direction.

14. The tape of claim 12 wherein one outside layer is not coated with adhesive.

15. A surgical adhesive tape pacakge comprising a roll of cloth fabric having threads arranged to enable at least 25% extension along its major dimensions, elongation in one direction being at the expense of contraction in the direction normal thereto, said roll being pre-extended in one direction, a pressure sensitive adhesive on said fabirc, a volatile solvent in conjunction with said adhesive and acting to restrain adjacent courses of said roll from adhering to each other but upon evaporation of said solvent leaving said adhesive with pressure-sensitive adhesion properties, and an evaporation-resistant container enclosing said roll and said solvent.

16. The package of claim 15 wherein the violatile solvent comprises as an essential ingredient isopropyl alcohol.

17. The package of claim 15 having a porous sheet which interleaves the separate courses of the adhesive-containing cloth fabric, said volatile solvent being adsorbed in said sheet.

18. The package of claim 17 wherein the porous sheet is cloth.

19. The package of claim 18 in which the sheet has extension characteristics similar to those of the adhesive-containing cloth fabric.

20. A surgical adhesive tape comprising a porous cloth fabric having threads arranged to enable at least 25% extension along both its major dimensions, elongation in one direction being at the expense of contraction in the direction normal thereto, a pressure-sensitive adhesive on both sides of said fabric adapted to firmly bond said fabric to similar and dissimilar materials upon contact therewith, and discrete cellulose particles adhered thereby to one side of said fabric at least partially closing the pores thereof and covering the spaces between threads.

21. The tape of claim 20 in which the cellulose particles are coated with an adhesive.

22. A surgical tape package comprising a radially stretched doughnut-shaped roll of tubular cloth fabric having threads arranged to enable substantial reversible elongation and contraction along the axis of said tube when unrolled with complementary contraction and expansion, respectively, of said tube's circumference, an adhesive on at least one surface of said tube, and means preventing adherence between adjacent layers of said tube in said roll.

23. The package of claim 22 in which the means preventing adherence is a volatile solvent incorporated in the adhesive, and the package is encased in an evaporation resistant container.

24. A surgical tape package comprising a doughnut shaped roll of tubular knit fabric containing an adhesive and separated from adjacent courses in the roll by a concentric layer of plastic sheeting.

25. The package of claim 24 in which the concentric layer of plastic is longer than the knit fabric and the excess length is wrapped around the roll to form an impervious cover.

26. The package of claim 25 in which a volatile solvent is incorporated in the package to assist unrolling and application of the tape.

27. A surgical adhesive tape comprising a fabric knit from at least two co-extending strands of fibers arranged to enable substantial reversible elongation along one major axis with complementary contraction in the direction normal thereto, one said strand being more loosely knit than another, and a pressure-sensitive surgical adhesive on at least one side of said fabric.

28. A surgical adhesive tape comprising a fabric knit from at least two co-extending separate threads, one substantially non-elastic, another elastic, arranged to enable substantial reversible elongation along one major axis with complementary contraction in the direction normal thereto, and a pressure-sensitive surgical adhesive on at least one side of said fabric.

References Cited by the Examiner

UNITED STATES PATENTS

| | | | |
|---|---|---|---|
| 2,196,492 | 4/1940 | Clark et al. | 128—539 |
| 2,349,710 | 5/1944 | Evans | 128—156 |
| 2,607,711 | 8/1952 | Hendricks | 154—53.5 X |
| 2,646,796 | 7/1953 | Scholl | 128—157 |
| 2,711,168 | 6/1955 | Brickman et al. | 128—156 X |
| 2,740,403 | 4/1956 | Schueler | 128—156 |
| 2,750,942 | 6/1956 | Robson | 128—156 |
| 2,914,421 | 11/1959 | Wiener | 206—59 X |

RICHARD A. GAUDET, *Primary Examiner.*

JORDAN FRANKLIN, *Examiner.*